United States Patent Office 3,464,273
Patented Sept. 2, 1969

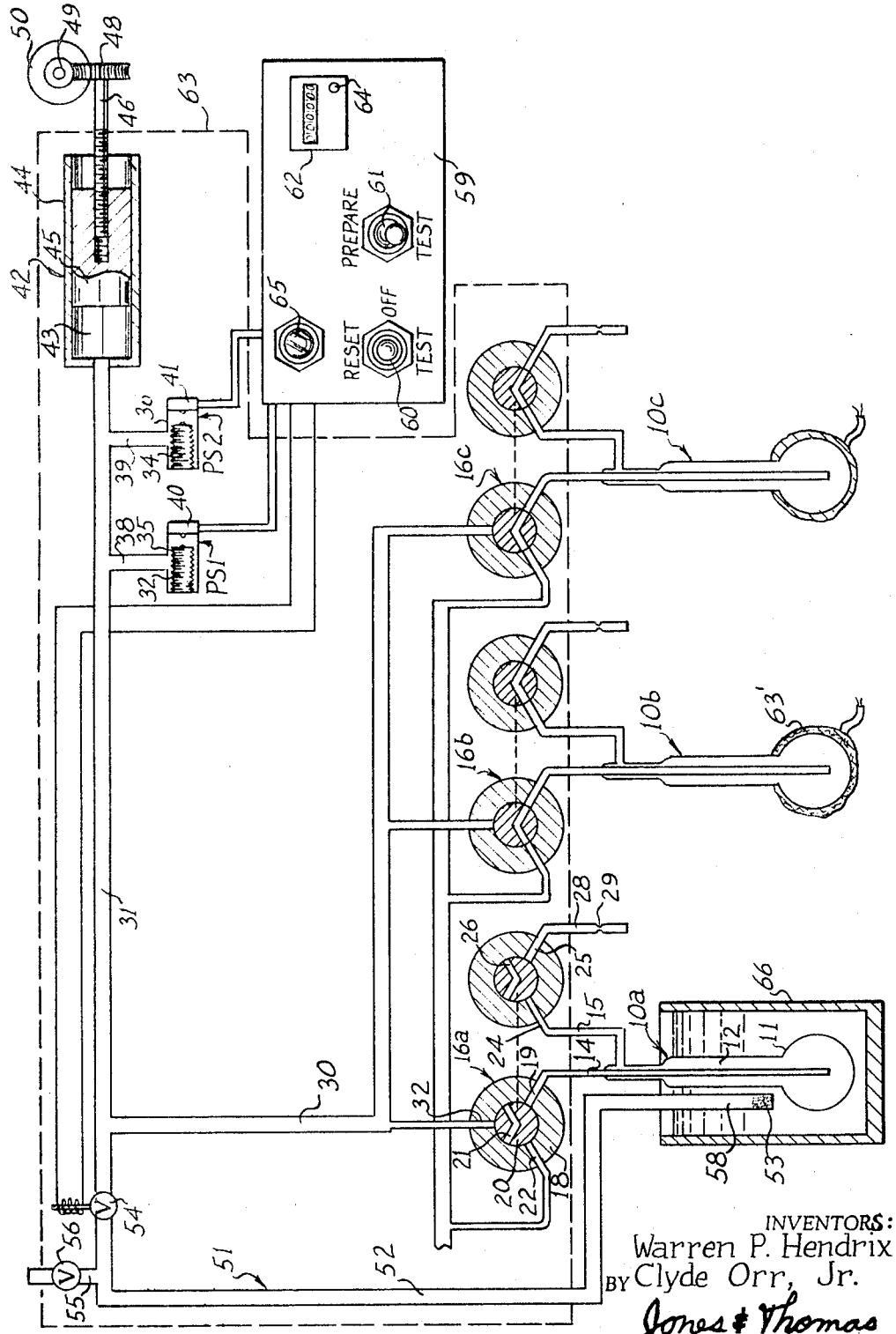

3,464,273
SURFACE AREA APPARATUS AND METHOD
Warren P. Hendrix, Lawrenceville, and Clyde Orr, Jr., Atlanta, Ga., assignors to Micromeritics Instrument Corporation, Norcross, Ga., a corporation of Georgia
Filed Apr. 8, 1968, Ser. No. 719,562
Int. Cl. G01f 15/14; G01j 5/04; G01k 1/08
U.S. Cl. 73—432
11 Claims

ABSTRACT OF THE DISCLOSURE

A method of measuring surface area by the adsorption of a gas in which a sample of material is placed in a container with an initial volume of gas at a predetermined first pressure and a predetermined first temperature above the adsorption temperature of the gas. The temperature of the gas is then reduced to the adsorption temperature of the gas and additional gas is added to the container to provide a predetermined second pressure which is the pressure the initial volume of gas would have in the absence of the adsorption of the gas. The gas added to the container is therefore equal to the gas adsorbed by the sample. An indicator responsive to the adding of gas to the container provides a direct indication of the surface area of the sample.

BACKGROUND OF THE INVENTION

Field of the invention

This invention relates to the measurement of surface area, and is more particularly concerned with a method of and an apparatus for obtaining a direct reading of the surface area of a granular or powdery material or similar substance.

Description of the prior art

In the field of physical chemistry and in both scientific and industrial applications, it is frequently necessary to determine the surface area of a substance such as a granular or powdery material. Since such a surface area cannot be measured directly, use is generally made of the well established technique of putting a monolayer of gas molecules on the surface of a sample of the material, measuring the amount of gas required, and determining what area the amount of gas will cover.

The usual prior art method and apparatus for using this technique to determine surface area require the filling of a container in which a sample of material has been placed with a gas and the measuring of various temperatures and pressures of the gas. Numerous steps must be taken in order to gather raw data and then a considerable amount of mental calculation must be made to obtain the desired surface area.

For a better understanding of this prior art method and apparatus, reference may be made to U.S. Patent No. 3,262,319. The difficulty with this prior art method and apparatus is that they require a skilled person and the expenditure of considerable time and effort to obtain the surface area of a sample of material.

Summary of the invention

The invention disclosed herein avoids the foregoing and other difficulties encountered with this prior art method and apparatus. This is because the invention provides a method and apparatus that can be used to obtain surface area by a relatively unskilled person and without the expenditure of the time and effort that is required by the prior art method and apparatus. Not only does the invention provide for the improved obtaining of the total surface area of a sample of material, but after the total surface area of a sample of material has been obtained, the sample of material can be weighed and the weight of the sample of material divided into the total surface area to obtain the surface area per unit of weight.

The method of the present invention includes the steps of placing a sample of material in a sample tube with a gas at a first pressure and at a first temperature which is above the adsorption temperature of the gas, lowering the temperature of the gas from the first temperature to a second temperature which is the adsorption temperature of the gas, and measuring the difference between the resulting volume of the gas and an adjusted volume of the gas which results from the addition of gas to the sample tube until the pressure of the gas is that second pressure that would result from the temperature change in the absence of adsorption of the gas by the sample of material. The difference between the resulting volume and the adjusted volume of the gas is the adsorbed volume of the gas which is adsorbed on the surface of the sample of material and this adsorbed volume of the gas is directly proportional to the surface area of the sample of material.

The apparatus of the present invention includes a sample tube in which a sample of material is placed, a variable volume device selectively communicable with the sample tube, temperature means for placing a gas in the sample tube at a first temperature which is above the adsorption temperature of the gas and at second temperature which is the adsorption temperature of the gas, first pressure responsive means for changing the volume of the variable volume device until the pressure of the gas in the sample tube is a first pressure at the first temperature, second pressure responsive means for changing the volume of the variable volume device until the pressure of the gas in the sample tube is a second pressure at the second temperature, and indicating means for indicating the change in volume of the variable volume device. In using the apparatus, a sample of material is placed in the sample tube and the pressure of a first volume of gas within the sample tube at a first temperature is adjusted to a first pressure by the first pressure responsive means.

The temperature of the gas is then lowered from the first temperature to the adsorption temperature of the gas which causes a lowering of pressure within the sample tube since gas is adsorbed. As the gas is adsorbed on the surface of the sample of material, the volume of the variable volume device is adjusted by the second pressure responsive means to add gas to the sample tube so as to establish and maintain a second pressure in the sample tube.

The second pressure maintained by the second pressure responsive means is the pressure which the initial volume of the gas would have at the second temperature of the gas in the absence of adsorption and the change in volume of the variable volume device is a measure of the portion of this initial volume of the gas which is adsorbed on the surface of the sample of material. Thus, the change in volume of the variable volume device is directly proportional to the surface area of the sample of material and an indicating means responsive to this change in volume provides a direct indication or reading of surface area.

BRIEF DESCRIPTION OF THE DRAWING

A better understanding of the invention will be had by consideration of the following specification when taken in conjunction with the accompanying drawing in which the single figure is a schematic representation of apparatus embodying the invention.

DESCRIPTION OF THE EMBODIMENT

Referring now more particularly to the drawing and to that embodiment here chosen by way of illustration, it will be seen that the apparatus includes a sample tube generally denoted by 10a and which serves as a container to receive the sample of material for which the surface area is desired. In this particular embodiment, three such sample tubes are shown, the other two sample tubes being denoted by 10b and 10c. However, all sample tubes 10a, 10b, and 10c and their related tubes and valves are identical, and only the sample tube 10a will be described in detail.

The sample tube 10a includes a flask 11 and an elongated neck 12 that communicates with two tubes 14 and 15. The tube 14 is an entrance tube and extends well into the flask 11 so as to terminate close to the bottom of the flask 11. The lower end of the tube 14 should be sufficiently low in the flask 11 to cause gas entering through the tube 14 to cover a sample of material in the flask 11, but it should be high enough to provide sufficient space for a sample of material in the flask 11 beneath the tube 14. The tube 15 is the exit tube for removing the gas from the flask 11, and the tube 15 communicates with the neck 12 of the sample tube 10a so that the gas passes from the flask 11 only after the gas has traversed the flask 11 containing the sample of material.

The tubes 14 and 15 are connected to a control valve 16a and although the valve 16a is shown in two parts, the valve 16a is an integral apparatus having interconnected stages so that the valve 16a can perform several functions. The control valve 16a has an outer housing 18 with passages, such as the passage 19 and a central rotatable core 20 with passages, such as the passage 21.

The tube 15 is connected to a passage 24 in the housing 18 and through a passage 26 in the core 20 to a passage 25 in the housing 18 when the core 20 is appropriately positioned. The passage 25 is connected to a tube 28 having a restriction 29. The tube 14 is connected to the passage 19 in the housing 18 and through the passage 21 in the core 20 to either a passage 22 or a passage 32 in the housing 18 depending upon the position of the core 20. The passage 22 in the housing 18 is connected to a source of gas (not shown) such as a source of nitrogen and the passage 32 is connected to a tube 30.

It will now be understood that with appropriate positioning of the core 20, a gas supplied from a source (not shown) passes through the passages 22, 21, and 19, to the tube 14 from which the gas is discharged over a sample of material in the flask 11. After being discharged over the sample of material, the gas passes into the neck 12 and into the tube 15, and with appropriate positioning of the core 20, the gas passes through the passages 24, 26, and 25 of the valve 16a and into and through tube 28. The restriction 29 in the tube 28 restricts the flow of gas to a rate at which none of the sample of material will be entrained in the gas and carried from the sample tube 10a.

The valve 16a is connected by the tube 30 to a manifold 31. Also connected to the manifold 31 are two pressure responsive devices PS1 and PS2. The devices PS1 and PS2 may be of any conventional type which will sense gas pressure and operate an electrical switch in response to a predetermined pressure. However, in that embodiment of the invention disclosed herein, the devices PS1 and PS2 include bellows 32 and 34 within housings 35 and 36 which are connected to the manifold 31 by tubes 38 and 39 respectively.

It will be understood that the bellows 32 and 34 are sealed with a predetermined pressure within each so that depending upon the pressure of a gas within the housings 35 and 36, the bellows 32 and 34 expand or contract. The expanding or contracting of a bellows 32 or 34 serves to open or close an electrical switch 40 or 41.

The manifold 31 is connected to a variable volume device 42 which includes a piston 45 reciprocably movable within a cylinder 44. The piston 45 is moved by rotation of a rod 46 which threadably engages the piston 45 and which has a gear 48 at its outer end that is rotated by a worm gear 49. The worm gear 49 is driven with a motor 50 so that movement of the piston 45 is controlled by operation of the motor 50. Thus, if the worm gear 49 is rotated in one direction by the motor 50, the volume of the space 43 in the cylinder 44 is reduced, and if the worm gear 49 is rotated in the opposite direction by the motor 50, the volume of the space 43 in the cylinder 44 is increased.

A pressure reducing means generally designated at 51 and including a tube 52 is connected to the manifold 31 through a solenoid operated valve 54. A branch 55 from the tube 52 contains a pressure relief valve 56 and it will be understood that the valve 56 opens at a predetermined pressure to release gas in the tube 52 and stays open until the pressure of the gas in the tube 52 is reduced to the predetermined pressure.

The tube 52 extends down and ends in a closed end 58 adjacent to the sample tube 10a. The closed end 58 of the tube 52 contains a material 53 having a very high surface area. The use of tube 52 and of the material 53 is described below.

The electrical circuit for the above described apparatus includes a control panel designated at 59. A detailed circuit is not shown because a variety of circuits appropriate to the apparatus will be apparent to those skilled in the art once the apparatus and method of the invention are understood.

Mounted in the panel 59 is a control switch 60 and a select switch 61. A conventional counter 62 is also mounted in the panel 59 and final determinations of surface area are read from the counter 62. A reset button 64 serves to "zero" the counter 62 after each use of the apparatus and a signal light 65 is mounted in the panel 59 to indicate when the surface area of a sample of material has been determined. The functions of the control switch 60 and other components mounted in the control panel 59 will be understood from the description of the operation of the apparatus below.

In connection with the operation of the apparatus and the method of the invention, it will be understood that the manifold 31, the variable volume device 42, the valve 16a, the devices PS1 and PS2, and related tubes are enclosed within a constant temperature housing 63 generally defined by the dashed line in the figure. The constant temperature housing 63 is only generally shown since it may be any conventional means for maintaining a gas in the manifold 31 and in the variable volume device 42 at a constant temperature throughout operation of the apparatus.

Upon initial operation of the apparatus, the manifold 31 and the variable volume device 42 are filled with a gas such as nitrogen by placing the core 20 of the valve 16a in position to connect passages 22 and 32. With a gas in the manifold 31 and the variable volume device 42 at the constant temperature provided by the housing 63 and after placing a sample of material in the sample tube 10a, the sample of material is heated by a heating mantle 63, such as those shown positioned on the sample tubes 10b and 10c. While the sample of material is being heated, the valve 16a is positioned to connect the passages 22 and 19 so that a gas such as nitrogen flows from the source of gas (not shown) through the valve 16a, through the tube 14, and over the sample of material in the flask 11. The gas entering the flask 11 rises and passes through the tube 15, through passages 24, 26, and 25 of the valve 16a, and through the tube 28 to the atmosphere.

The heating of the sample of material and the flow of the gas serve to remove water and undesired gases from the sample tube 10a and the sample of material and when the sample of material is purified by the removal of water and undesired gases, the heating mantle 63 is removed from the sample tube 10a and the valve 16a is rotated so that passages 32 and 19 are connected to place the sample tube 10a in communication with the manifold 31. In addition, a container 66 is placed around the sample tube 10a. The container 66 is filled with an appropriate liquid or other medium to fix the temperature of the sample tube 10a at a predetermined first temperature. Although the predetermined first temperature may be any temperature above the adsorption temperature of the gas, it is convenient to use ice and water in the container 66 to provide a predetermined first temperature of 0° centigrade.

With the gas and the sample of material in the sample tube 10a at the predetermined first temperature provided by the medium in the container 66 and with the sample tube 10a connected to the manifold 31, the control switch 60 is placed in a test position which selects the device PS1 as the device which senses the pressure of the gas in the manifold 31. The device PS1 causes operation of the motor 50 to move the piston 45 until the total volume of the manifold 31, the sample tube 10a, the space 43 in the variable volume device 42, and connected components of the apparatus is such that the pressure in the sample tube 10a is the predetermined first pressure to which the device PS1 is responsive. Thus, the gas in the sample tube 10a is at a predetermined first temperature and a predetermined first pressure.

After the gas in the sample tube 10a is placed at this first temperature and first pressure, the control valve 16a is moved to a position at which none of the passages is connected with another and the control switch 60 is moved to the reset position indicated on the panel 59 in the figure. This operates the motor 50 to retract the piston 45 to that position which provides the greatest space 43 in the variable volume device 42. The sample tube 10a is now cooled to an absorption temperature of the gas in sample tube 10a. With nitrogen being used as the gas in the sample tube 10a, the temperature of liquid nitrogen is a convenient adsorption temperature and this adsorption temperature is easily provided by replacing the ice water or other first temperature medium in the container 66 with liquid nitrogen. It will be understood that if liquid nitrogen is used in the container 66, the adsorption temperature is −195° centigrade.

After the gas and sample of material in the sample tube 10a are cooled to the adsorption temperature of the gas in the sample tube 10a, both the control switch 60 and the select switch 61 are placed in the test position indicated on the panel 59 in the figure. This makes the device PS2 sense the gas pressure in the manifold 31 and also operates the solenoid valve 54 for a short period of time to connect the tube 52 to the manifold 31 for a corresponding period of time.

It will be understood that the end 58 of the tube 52 is immersed in the liquid nitrogen or other medium in the container 66 for providing an adsorption temperature. Therefore, when the valve 54 is opened, a large amount of the gas in the manifold 31 passes into the tube 52 not only because of the volume of the tube 52 but also because the material 53 in the end 58 of the tube 52 has a large surface area on which a considerable amount of gas is adsorbed at the adsorption temperature provided by the medium in the container 66. Moreover, if the pressure is excessively high in the tube 52 following opening of the valve 54, the valve 56 opens in response to the pressure and exhausts some of the gas to the atmosphere.

Thus, the opening of valve 54 provides a very rapid lowering of the pressure of the gas in the manifold 31 by providing for an increase in volume, the adsorption of gas, and the release of gas to the atmosphere. At the same time, the motor 50 is operating in response to the device PS2 and adjusting the volume of the space 43 in the variable volume device 42. However, the reduction in the pressure of the gas in the manifold 31 while the valve 54 is open is such that the variable pressure device 42 serves primarily subsequent to the closing of the valve 54 to adjust the pressure in the manifold 31 to that low pressure to which the device PS2 is responsive.

As indicated above, the manifold 31 is maintained at a constant temperature throughout the operation of the apparatus by the constant temperature housing 63 and it will be understood that subsequent to the operation of the valve 52 and the variable pressure device 42, the gas in the manifold 31 is at this constant temperature and at a predetermined second pressure. This predetermined second pressure is that low pressure to which the device PS2 is responsive and is also that pressure which the gas in the sample tube 10a would have after the change from the first temperature to the second temperature in the absence of any adsorption of the gas.

With the gas in the manifold 31 at this predetermined second pressure, the control valve 16a is moved so that the passage 21 in the core 20 connects the passages 19 and 32 so as to connect the sample tube 10a to the manifold 31. Since the gas in sample tube 10a is at the adsorption temperature of the gas and since the sample tube 10a contains a sample of material having a surface area, some gas in the sample tube 10a has been adsorbed and the pressure of the gas in the sample tube 10a is less than the predetermined second pressure. Thus, after the sample tube 10a is connected to the manifold 31, the device PS2 senses a pressure less than the predetermined second pressure and energizes the motor 50 to move the piston 45 and change the volume of the space 43 in the variable volume device 42 until the pressure in both the manifold 31 and the sample tube 10a is the predetermined second pressure.

Since adsorption of the gas by the sample of material in the sample tube 10a continues for a period of time, it is generally necessary to change the space 43 in the variable volume device 42 for a corresponding period of time in order to provide the predetermined second pressure in the sample tube 10a. However, when the motor 50 is not energized for a period of time such as two minutes which is sufficient to insure that the adsorption of the gas is complete, the light 65 is energized to indicate that adsorption is complete.

Each time the motor 50 is energized in response to the changing gas pressure resulting from adsorption of the gas in the sample tube 10a, the counter 62 is operated. Thus, the reading of the counter 62 is directly proportional to the distance the piston 45 was moved by the motor 50 and to the change in the volume of the space 43 in the variable volume device 42 required to provide the predetermined second pressure in the same tube 10a. With calibration of the counter 62 in conventional manner and in terms of the surface area corresponding to a particular change in volume of the space 43 of the variable volume device 42, the surface area of a sample of material in the sample tube 10a is indicated directly by the counter 62. Simply weighing the sample of material and dividing its weight into the surface area indicated by the counter 62 provides the surface area per unit weight of the sample of material.

Prior to using the apparatus again, the gas that has escaped in previous use of the apparatus is replaced. This is done by moving the control valve 16a so that the passages 22 and 32 are connected and by moving the control switch to the reset position shown on the panel 59 in the figure.

While the surface area of a sample of material in the sample tube 10a is being obtained, two or more other samples of material may be in preparation in the sample tubes 10b and 10c. Thus, the plurality of sample tubes 10a, 10b, and 10c allow continuous operation of the apparatus since at least one more sample of material can always be prepared in advance.

From the foregoing, it will now be understood that the method of the present invention includes fixing an initial volume of a gas in a container with a sample of material at a first pressure and at a first temperature greater than the adsorption temperature of the gas, lowering the temperature of the gas to the adsorption temperature of the gas, and adding gas to the container as the gas is adsorbed and until the pressure of the gas in the container is that second pressure which the initial volume of gas would have at the second temperature in the absence of adsorption of the gas by the sample of material. The volume of the gas added to the cotnainer is directly proportional to the surface area of the sample of material.

While a particular apparatus and specific method steps have been described, it will be understood that they are by way of illustration only and are meant to be in no way restrictive. Therefore, numerous changes and modification may be made and the full use of equivalents resorted to without departing from the scope of the invention.

We claim:

1. In a method of determining the surface area of a sample of material by the adsorption of a gas on the surface of the sample of material, the steps of placing a sample of material in an initial volume of a gas, fixing the temperature of said gas at an adsorption temperature for said gas, adding an additional volume of said gas to said initial volume of a gas as said gas is adsorbed so as to maintain a predetermined pressure, and measuring said additional volume of said gas.

2. The method of claim 1 in which said adsorption temperature is a predetermined second temperature and including the step of fixing the temperature of said gas at a predetermined first temperature higher than said adsorption temperature prior to the step of fixing the temperature of said gas at an adsorption temperature for said gas.

3. The method of claim 2 in which said predetermined pressure is the pressure of said initial volume of a gas after a change in temperature from said predetermined first temperature to said predetermined second temperature in the absence of adsorption of said gas by said sample of material.

4. The method of claim 3 in which said predetermined pressure is a predetermined second pressure and including the step of fixing the pressure of said gas at a predetermined first pressure when said gas is at said predetermined first temperature.

5. In an apparatus for determining the surface area of a sample of material, a sample tube to receive said sample of material, variable volume means for providing a space of varying size in communication with said sample tube, temperature means for fixing the temperature of a gas in said sample tube at a predetermined temperature, pressure responsive means for providing an output related to a predetermined pressure of said gas, and means for changing the size of said space in said variable volume means in response to said output.

6. The apparatus of claim 5 in which said pressure responsive means is a first pressure responsive means for providing an output related to a predetermined first pressure of said gas and including a second pressure responsive means for providing an output related to a predetermined second pressure of said gas.

7. The apparatus of claim 6 including switch means for rendering said first pressure responsive means and said second pressure responsive means alternately operative.

8. The apparatus of claim 6 including pressure reducing means for reducing the pressure of said gas, said pressure reducing means including a tube, a high surface area material within said tube, and means to cool a gas in said tube to an adsorption temperature.

9. The apparatus of claim 6 including a valve means for connecting said sample tube to a source of gas.

10. The apparatus of claim 6 including a plurality of sample tubes selectively connected to said variable volume means.

11. The apparatus of claim 5 in which said variable volume means includes a cylinder, a piston within said cylinder, means for moving said piston within said cylinder, and indicating means for indicating motion of said piston within said cylinder.

References Cited

UNITED STATES PATENTS

| | | | |
|---|---|---|---|
| 2,960,870 | 11/1960 | Nelsen et al. | 73—432 |
| 3,059,478 | 10/1962 | Coggeshall et al. | 73—432 |
| 3,203,252 | 8/1965 | Polinski et al. | 73—432 |
| 3,262,319 | 7/1966 | Orr et al. | 73—432 |
| 3,296,869 | 1/1967 | Bültemann | 73—432 |
| 3,349,625 | 10/1967 | Benusa et al. | 73—432 |

OTHER REFERENCES

Kremen, J. et al.: A New Approach to Surface Area Determinations by Selective Gas Adsorption in a Nitrogen-Helium System. Paper No. 110 delivered at the Pittsburgh Conference on Analytical Chemistry and Applied Spectroscopy, Mar. 1–5, 1965, pp. 1–16.

LOUIS R. PRINCE, Primary Examiner

J. W. ROSKOS, Assistant Examiner